US006261660B1

(12) United States Patent
Cholod et al.

(10) Patent No.: US 6,261,660 B1
(45) Date of Patent: Jul. 17, 2001

(54) PREPARATION OF A RECORDING CARRIER

(75) Inventors: Michael Stefan Cholod, Bensalem; Donald Richard Hone, Wrightstown; David Henry Stone, Fairless Hills, all of PA (US)

(73) Assignee: Atofina, Paris (FR)

( * ) Notice: Subject to any disclaimer, the term of this patent is extended or adjusted under 35 U.S.C. 154(b) by 0 days.

(21) Appl. No.: 09/445,850

(22) PCT Filed: Jun. 15, 1998

(86) PCT No.: PCT/EP98/03582

§ 371 Date: Dec. 15, 1999

§ 102(e) Date: Dec. 15, 1999

(87) PCT Pub. No.: WO98/57799

PCT Pub. Date: Dec. 23, 1998

Related U.S. Application Data

(60) Provisional application No. 60/049,845, filed on Jun. 17, 1997.

(51) Int. Cl.[7] ............................................. B32B 3/02
(52) U.S. Cl. ..................... 428/64.1; 428/64.2; 428/64.4; 428/913; 430/270.11; 430/495.1; 430/945; 524/317
(58) Field of Search .................. 428/64.1, 64.2, 428/64.4, 913; 430/270.11, 495.1, 945; 524/317

(56) References Cited

U.S. PATENT DOCUMENTS

| 5,080,945 | 1/1992 | Moriwaki et al. . |
| 5,510,408 | 4/1996 | Fuchigami et al. . |
| 5,549,941 | 8/1996 | Banyay et al. . |

FOREIGN PATENT DOCUMENTS

| 0 008 543 A1 | 8/1979 | (EP) | ................ G11B/3/70 |
| 0 218 256 A2 | 10/1986 | (EP) | ................ C08K/5/10 |
| 0 463 382 A2 | 5/1991 | (EP) | ................ G11B/11/10 |
| 0 718 808 A2 | 12/1996 | (EP) | ................ C08L/33/12 |
| 2 276 634 | 1/1994 | (GB) | ................ C23C/14/35 |
| H8-132496 | 11/1994 | (JP) | ................ B29C/45/70 |
| H9-48827 | 8/1995 | (JP) | ................ C08F/220/14 |

*Primary Examiner*—Elizabeth Evans
(74) *Attorney, Agent, or Firm*—Gilbert W. Rudman; Stanley A. Marcus

(57) ABSTRACT

The invention relates to a process for preparing molded discs suitable for use in optical information recording carriers and to the optical information recording carriers thereby obtainable.

The process comprises plasticating a homopolymer or a copolymer of methyl methacrylate, injecting the plasticated homopolymer or copolymer into a mold to form a disc and removing the molded disc in a very short cycle time.

Good quality discs which are particularly suitable for use in optical information recording carriers may thereby be obtained.

11 Claims, No Drawings

PREPARATION OF A RECORDING CARRIER

This application claim benefit to provisional application Ser. No. 60/049,845 filed Jun. 17, 1997.

This invention relates to a preparation of molded discs for use in optical information recording carriers. In particular, this invention relates to the use of certain acrylic polymers in preparing two-sided optical information carriers, also known as digital video discs.

Polymers have become the medium for embedding information as optical information recording carriers. Polycarbonate has dominated the compact disc market, while acrylic polymers, based on polymers of methyl methacrylate, have dominated the laser-readable video disc market.

Two-sided optical information carriers (also called digital video discs, digital versatile discs, "DVD", "DVD-ROM", "DVD-RAM" or "DVD-R") hold much more information than compact discs. Compact discs are based on a single molded disc having a metal facing on one surface, while the final DVD assemblage is two-sided (two discs). As DVD's hold much more information than compact discs, DVD's require precise copying of the pit depths and dimensions of the master facing mold during molding of the individual discs.

In order to produce DVD's on which information can be encoded and read with a low error rate, a number of variables must be controlled. The purity of the starting molding resin must be carefully controlled as impurities can affect reading of the encoded data. The molding resin must be able to flow sufficiently in order to properly fill the mold. The molding resin must be able to precisely replicate the pit depths and dimensions with minimal deformation around the pit. A molding resin that does not precisely replicate the pit depths and dimensions will have increased error in reading the encoded data.

Birefringence of the molded disc must be minimized for high-quality discs and can be controlled by avoiding molded-in stresses in the disc. Birefringence is a measure of optical retardation due to small non-uniformities in disc composition resulting in small, but important differences in the index of refraction. These small non-uniformities are often due to polymer orientation which occurs as a result of the injection molding operation. Birefringence values differing from zero by more than 50 nm are unacceptable. Birefringence leads to a loss of signal intensity, and therefore increased error in reading the encoded data.

Birefringence is a problem with polycarbonate discs because polycarbonate's high stress optical coefficient and stiff flow make it difficult to mold discs with low birefringence values. The low stress optical coefficient and easy flow of acrylic polymers generally result in significantly less birefringence, and offer better replication of the master facing mold.

Discs made from acrylic polymers are less rugged than those made from polycarbonate and are prone to breakage and warpage. A solution to the breakage and warpage problem is to increase the molecular weight of the acrylic polymer used. However, as the molecular weight of the acrylic polymer increases, its flowability decreases. A decrease in the polymer's flowability decreases the polymer's ability to properly fill the mold and, therefore, to precisely copy the pit depths and dimensions of the master facing mold. This results in a disc that has a higher error rate in reading the encoded data.

Japanese unexamined Patent Application 08-132,496 A discloses a method for molding optical discs with specific control of melt and mold temperatures and control of mold pressure in a two-step operation. Their application does not disclose the specific compositions and molecular weights of the acrylic polymers used, except to list a broad list of monomer combinations, and to list a preferred molecular weight range for a copolymer with no more than 80% of polymerized units of methyl methacrylate, and an exemplification of a methyl methacrylate copolymer with 10 weight percent methyl acrylate. The glass transition temperatures of the polymers disclosed in this application will be less than 100° C. Such glass transition temperatures are not high enough to provide an acrylic polymer that sufficiently resists breakage and warpage. This application implies that the composition and molecular weight are less important than the specific molding conditions.

Japanese Patent 85-045,649 B2 (Arakawa et al.) discloses an optical information recording carrier, containing a copolymer of methyl methacrylate and ethyl acrylate having a specific composition and intrinsic viscosity. The polymers disclosed in Arakawa et al. have an intrinsic viscosity within the range of greater than or equal to 0.4 dl/g and less than or equal to 0.62 dl/g, as defined by the formula $0.4 \leq y \leq (1/45)x+0.334$, where "y" is the intrinsic viscosity and "x" is the weight percent of ethyl acrylate in the copolymer. The weight percent of ethyl acrylate in the copolymer can vary from 3 to 13. Arakawa et al. focus on the flowability of the polymer. Arakawa et al. do not suggest an acrylic polymer that also resists breakage.

Japanese patent application 09-48827 A (Ohtani et al.) discloses methyl methacrylate copolymers having 3–10% by weight of a ($C_1$–$C_8$) alkyl acrylate. The process disclosed by Ohtani et al. is not applicable to methyl methacrylate homopolymer or copolymers having less that 3% by weight of a lower alkyl acrylate.

There is, therefore, a continuing need to develop acrylic polymers useful in double-sided optical information carriers that resist breakage and warpage, still have sufficient flowability such that they precisely replicate pit depths and dimensions in the master facing mold and can be molded in a very short mold cycle time.

The present invention is directed to preparing an optical information recording carrier as a component of a digital video disc, the optical information recording carrier comprising a homopolymer or copolymer of methyl methacrylate with no more than 6% wt of a copolymerized lower alkyl acrylate, the molecular weight of the homopolymer or copolymer being in the range of from 90,000 to 160,000, and the homopolymer or copolymer having a Tg in the range of from 100° C. to 115° C.

The present invention is further directed to a process for preparing a suitable disc for use in an optical information carrier which process comprises:

(A) plasticating a homopolymer or a copolymer of methyl methacrylate containing no more than 6% wt of a copolymerized lower alkyl acrylate, the molecular weight of the homopolymer or copolymer being in the range of from 90,000 to 160,000, and the homopolymer or copolymer having a Tg in the range of from 100° C. to 115° C., in the barrel of an injection molding machine at a temperature of at least 270° C.;

(B) injecting the plasticated homopolymer or copolymer into a mold, at a temperature of less than 80° C. to form a molded disc having discrete pits; and (C) removing the molded disc, suitably in a cycle time of 6 seconds or less.

The following terms shall have the following meanings, unless the context clearly indicates otherwise.

The term "molecular weight" means "weight average molecular weight," abbreviated "MW." Molecular weight is estimated by conventional gel permeation chromatographic methods, using poly(methyl methacrylate) standards for calibration. "Lower alkyl" means linear or branched $C_1$–$C_4$ alkyl, such as methyl, ethyl, n-propyl, iso-propyl, n-butyl and iso-butyl. "Tilt" is a measurement of flatness made on the assembled two-sided optical information carrier by determining the angular deviation of an incident light beam. Tilt values of less than 0.30° in the radial direction and of less than 0.15° in the tangential direction are considered acceptable.

The term "polymer" and "copolymer" are used interchangeably, and the former term encompasses the latter term. As used herein, the term "acrylic" polymer means a polymer derived from acrylate or methacrylate monomers, or both, such as methyl acrylate, methyl methacrylate, ethyl acrylate and butyl acrylate.

All amounts are percent by weight ("% wt"), unless otherwise noted, and all % wt ranges are inclusive. As used herein, the following abbreviations are applied: Tg=glass transition temperature; "nm"=nanometer; "mm"= millimeter; "dl"=deciliter; "g"=gram; "MMA"=methyl methacrylate; "EA"=ethyl acrylate; and "AFM"=atomic force microscopy.

Birefringence is measured in terms of the phase shift between the x and y components of light through 0.6 mm thick parts and is expressed in nanometers.

The polymers useful in this invention have a sufficiently high molecular weight and Tg such that the resulting injection molded discs are resistant to breakage and warpage. It is preferred that the acrylic polymer composition be a copolymer of methyl methacrylate and a lower alkyl acrylate. The copolymerized alkyl acrylate is preferably methyl acrylate or ethyl acrylate.

When the acrylic polymer is a copolymer of methyl methacrylate and a lower alkyl acrylate, the amount of the lower alkyl acrylate is up to 6% by weight based on the total weight of monomers. Preferably, the amount of lower alkyl acrylate is from 0.5% to 5% by weight based on the total weight of monomers. Most preferably, the amount of lower alkyl acrylate is from 1% to 4% by weight based on the total weight of monomers. Especially preferred acrylic polymers are methyl methacrylate homopolymer and 97% wt MMA/ 3% wt EA copolymer.

The molecular weight of the homopolymer or copolymer is in the range of from 90,000 to 160,000. Preferred molecular weights are generally in the range of from 90,000 to 135,000 and most preferred are generally in the range of from 90,000 to 115,000. The intrinsic viscosities of these polymers are generally greater than 0.46 dl/g.

The acrylic polymers useful in this invention have a range of Tg generally from 100° C. to 115° C. Tg's in the range of generally from 105° C. to 115° C. are preferred.

In general, the acrylic copolymer is a random copolymer. The acrylic polymers of this invention and their preparation is known in the art, for example, see U.S. Pat. No. 5,549,941 (Banyay et al).

The discs of the present invention are prepared by an injection molding process, which includes the process known as injection-compression molding. The discs are prepared by an operation wherein the mold having an insert containing encoded information, also known as the stamper, is filled with the molten resin, and then the mold is compressed prior to ejection of the cooled molded article. This process is known to offer advantages in obtaining strain-free parts, thus the discs produced by this process have less birefringence.

The shape, depth and spacing of the pits and grooves molded into the discs are important in the amount and quality of information to be contained on the disc and read by the laser. Well defined pits of the proper depth are important in reducing the errors in reading as compared to shallower pits. Methods such as electron microscopy and atomic force measurements can be used to determine the depth of pits, and the extent of "flatness" near a pit. The "tilt" relates to the extent of error due to angular deviations in the reflected laser beam due to distortion in the flatness of the disc. A high tilt value is deleterious to good signal detection and can cause vibration during disc rotation. High values are usually caused by stresses within the molded discs, therefore, lower tilt values are desirable.

Discs prepared from the acrylic polymers useful in the present invention not only resist breakage and warpage, but also have low tilt values. The acrylic polymers useful in the present invention, because of their higher molecular weights and Tg's, require special processing conditions to provide sufficient flowability in order for the acrylic polymers to precisely replicate the pit depths and dimensions of the master facing disc. These processing conditions are achieved by the present invention without decomposition of the acrylic polymer. When the acrylic polymer decomposes, the resulting injection molded discs contain bubbles, charring and discoloration, which render the disc useless as an optical information recording carrier.

A barrel injection temperature of at least 270° C. is necessary for the acrylic polymer of the invention to have sufficient flowability. A barrel injection temperature of from 280° to 330° C. is preferred. Most preferred is a temperature of from 295° to 320° C. It is preferred that the mold temperature be from 55° C. to 75° C. More preferred is a mold temperature of from 55° C. to 65° C.

The mold cycle time is the time the injected molten resin remains in the mold. The process for preparing injection molded discs utilizes a mold cycle time of 6 seconds or less. Longer mold cycle times may be used, but at increased costs in manufacture.

In a preferred aspect of the above process, the molding time cycle includes a mold fill time of less than 0.1 second. In a separately preferred process, the molding process is injection-compression molding, and the mold is filled through a diaphragm gate so that polymer is distributed radially to all areas of the mold.

It is preferred that the injection molded disc be from 0.3 mm to 1.2 mm in thickness. Especially preferred is an injection molded disc having a thickness of 0.6 mm.

The acrylic polymers useful in this invention can be molded into discs that have birefringence values less than 30 nm. It is preferred that the injection molded disc exhibit birefringence values less than 10 nm.

The disc resulting from the present process may be converted into an appropriate optical information recording carrier by known processes. Two-sided discs are typically assembled by coating a first molded disc with a metal, such as by sputtering; and adhering a second molded disc to the first disc with an adhesive. Optionally, the first molded disc, after being coated with a metal and before being combined with a second disc, may then receive a protective coating, such as laquer. Suitable metals include, but are not limited to: aluminum, aluminum alloys and gold. Suitable adhesives include, but are not limited to: hot melt, heat-curable and radiation curable.

Optical information recording carriers according to this invention are useful in any application where a two-sided disc can be used. Suitable applications include, but are not limited to: DVDs, optical storage computer discs (DVD-ROM) and music storage discs.

The following examples are intended to illustrate further various aspects of the present invention, but are not intended to limit the scope of the invention in any aspect.

The acrylic homopolymer and copolymers used in the following Examples were prepared according to U.S. Pat. No. 5,549,941, Example 1A ('941), except that the ratios of MMA/EA were changed and the molecular weight was controlled to yield the compositions shown in Table 1. For optical uses, extreme care was taken in the cleanliness of the raw materials and equipment, including appropriate filtration devices where needed.

The compositions of the copolymer are described by conventional nomenclature, such as 94 MMA/6 EA, where the number represents the % wt of the stated monomer from which the copolymer was derived, such as 94% wt of methyl methacrylate; the "/" merely separates the descriptive terms.

EXAMPLE 1

By following the procedure in '941, the following polymers were prepared.

| Sample | MMA/EA | MW | Tg (° C.) |
|---|---|---|---|
| A | 94/6 | 95,000 | 100 |
| B | 100/0 | 95,000 | 115 |
| C | 97/3 | 95,000 | 108 |
| Comparative | 92/8 | 90,000 | 93 |

EXAMPLE 2

Discs were prepared by injection-compression molding the composition of Sample A (94 MKA/6 EA) and the Comparative sample (92 MMA/8 EA) from Example 1 on a Nissei injection molding machine. The discs were molded using a barrel injection temperature of 270° C. Injection time was typically 0.09 seconds and the total cycle time ranged from 4.5 to 5.5 seconds. The surface quality of the molded discs was examined by AFM. The error rate of reading data encoded on each disc was also determined. Data Error Rate is a machine read error reading. A lower error reading indicates less interference from undesirable defects in data replication (i.e. a better disc). These results are shown below.

|  | Sample 1 | Comparative |
|---|---|---|
| Surface Quality of Disc | good–very good | poor |
| Data Error Rate | <1 | 45.1 |

The surface quality of discs made using the composition of sample A was good to very good, while the surface quality of the discs made using the comparative composition was poor. The data also show that the data error rate of the comparative discs was very high (>45), such that the data encoded on the discs was unreadable. The data error rate for discs made using the composition of the invention (Sample 1) was <1, yielding discs that were easily readable. The above data show that methyl methacrylate polymers having a Tg of at least 100° C. provided molded discs having very good surface quality that are easily readable.

EXAMPLE 3

Discs were prepared according to Example 2 from the composition of Sample A (from Example 1) with a barrel injection temperature of either 260° C. or 270° C. The surface quality of the molded discs was examined by AFM. The error rate of reading data encoded on each disc was also determined. These results are shown below.

|  | 260° C. | 270° C. |
|---|---|---|
| Surface quality | poor | very good |
| Data Error Rate | poor | very good |

The surface quality of discs made at 270° C. was very good and the data error rate was also very good, the data encoated on the discs being easily readable. In comparison, the surface quality of the discs made at 260° C. was poor and the data error rate was also poor, yielding unreadable discs.

When discs were molded according to Example 2 using the composition of Sample B (from Example 1) with a barrel injection temperature of 340° C., substantial decomposition of Sample 2 occurred. However, using a barrel injection temperature of 320° C. resulted in readable discs with no noticeable polymer decomposition.

|  | 320° C. | 340° C. |
|---|---|---|
| Processability | good | poor |

EXAMPLE 4

Discs were prepared according to Example 2 from the compositions of Sample A and Sample C (from Example 1) using a barrel injection temperature of 280° C. The surface quality of discs made from both compositions, as determined by AFM, was very good and the data error rate was also good. Angular light beam deviation values for discs made from Sample 3 were lower as compared with those for discs made from Sample 1.

|  | Sample C | Sample A |
|---|---|---|
| Radial direction | <0.30° | >0.30° |
| Tangential direction | <0.15° | >0.15° |

The lower angular light beam deviation values for Sample C indicate that the discs molded from the composition of Sample C are flatter than those molded from the composition of Sample A.

What is claimed is:

1. A digital video disc which comprises an optical information recording carrier comprising a homopolymer or copolymer of methyl methacrylate containing no more than 6% wt of a copolymerized lower alkyl acrylate, the molecular weight of the homopolymer or copolymer being in the range of from 90,000 to 160,000, and the homopolymer or copolymer having a Tg in the range of from 100° C. to 115° C.

2. A digital video disc which comprises an optical information recording arrier comprising a homopolymer or copolymer of methyl methacrylate containing no more that 6% wt of a copolymerized lower alkyl acrylate, the molecular weight of the homopolymer of copolymer being in the range of from 90,000 to 160,000, and the homopolymer or copolymer having a Tg in the range of from 100 C. to 115 C. and the disc is prepared according to the process of claim 1.

3. A process for preparing a molded disc suitable for use in an optical information recording carrier which process comprises:

(A) plasticating a homopolymer or a copolymer of methyl methacrylate containing no more than 6% wt of a copolymerized lower alkyl acrylate, the molecular weight of the homopolymer or copolymer being in the range of from 90,000 to 160,000, and the homopolymer or copolymer having a Tg in the range of from 100° C. to 115° C., in the barrel of an injection molding machine at a temperature of at least 270° C.;

(B) injecting the plasticated homopolymer or copolymer into a mold, at a temperature of less than 80° C. to form a molded disc having discrete pits; and (C) removing the molded disc.

4. A process according to claim 3 wherein the barrel injection temperature is in the range of from 280° to 330° C. and the mold temperature is in the range of from 55° to 75° C.

5. A process according to claim 3 wherein the copolymer comprises 97% wt methyl methylacrylate and 3% wt ethyl acrylate.

6. A process according to claim 3 which further comprises the steps of coating a first molded disc with a metal and adhering a second molded disc to the first molded disc with an adhesive.

7. A process according to claim 6 wherein the metal is selected from aluminum, aluminum alloys or gold.

8. A process according to claim 7 wherein the first molded disc is coated with the metal by sputtering.

9. An injection molded disc prepared by the process claimed in claim 3.

10. A process according to claim 4 wherein the barrel injection temperature is from 295° to 320° C.

11. A process according to claim 10 wherein the molded disc is removed from the mold in a cycle time of 6 seconds or less.

* * * * *